United States Patent
Derclaye et al.

(10) Patent No.: US 9,739,154 B2
(45) Date of Patent: Aug. 22, 2017

(54) AXIAL TURBOMACHINE STATOR WITH AILERONS AT THE BLADE ROOTS

(71) Applicant: Techspace Aero S.A., Herstal (Milmort) (BE)

(72) Inventors: Alain Derclaye, Couthuin (BE); David Depaepe, Liege (BE)

(73) Assignee: Safran Aero Boosters SA, Herstal (BE)

( * ) Notice: Subject to any disclaimer, the term of this patent is extended or adjusted under 35 U.S.C. 154(b) by 409 days.

(21) Appl. No.: 14/268,799

(22) Filed: May 2, 2014

(65) Prior Publication Data

US 2014/0328675 A1 Nov. 6, 2014

(51) Int. Cl.
| | |
|---|---|
| *F04D 29/54* | (2006.01) |
| *F01D 5/14* | (2006.01) |
| *F01D 9/04* | (2006.01) |
| *F04D 29/68* | (2006.01) |

(52) U.S. Cl.
CPC .............. *F01D 5/142* (2013.01); *F01D 5/146* (2013.01); *F01D 9/041* (2013.01); *F04D 29/542* (2013.01); *F04D 29/544* (2013.01); *F04D 29/681* (2013.01); *Y02T 50/672* (2013.01); *Y02T 50/673* (2013.01)

(58) Field of Classification Search
CPC .......... F01D 5/142; F01D 5/146; F01D 9/041; F04D 29/542; F04D 29/544; F04D 29/681; Y02T 50/672; Y02T 50/673
See application file for complete search history.

(56) References Cited

U.S. PATENT DOCUMENTS

| | | | | |
|---|---|---|---|---|
| 2,839,239 | A * | 6/1958 | Stalker | F04D 21/00 415/181 |
| 3,039,736 | A | 6/1962 | Lemuel | |
| 3,075,743 | A * | 1/1963 | Sheets | F01D 5/142 415/199.4 |
| 3,193,185 | A * | 7/1965 | Erwin | F01D 5/145 415/193 |
| 3,692,425 | A * | 9/1972 | Erwin | F01D 5/146 415/181 |

(Continued)

FOREIGN PATENT DOCUMENTS

| | | |
|---|---|---|
| EP | 1122407 A2 | 8/2001 |
| EP | 1927723 B1 | 10/2009 |

(Continued)

OTHER PUBLICATIONS

European Search Report dated Sep. 24, 2013 for EP 13166527.5.

*Primary Examiner* — Jesse Bogue
(74) *Attorney, Agent, or Firm* — James E. Walton

(57) ABSTRACT

The present application relates to the compressor stator of an axial turbomachine. The stator comprises an annular row of main stator blades and auxiliary blades each of which are associated with a main blade. The auxiliary blades are located at the trailing edges of the main blades and are in the vicinity of the pressure faces of the main blades. The auxiliary blades are aligned to generate a low-pressure area at the trailing edges of the main blades. Thus, a flow bypassing a main blade by its suction face is sucked in by the low-pressure area when it approaches the trailing edge of the main blade. Stalling is thus avoided and the efficiency of the machine is improved.

18 Claims, 3 Drawing Sheets

(56) References Cited

U.S. PATENT DOCUMENTS

| | | | | |
|---|---|---|---|---|
| 3,724,968 A | * | 4/1973 | Friberg | F04D 21/00 415/181 |
| 4,512,718 A | * | 4/1985 | Stargardter | F01D 5/142 415/181 |
| 2011/0318172 A1 | * | 12/2011 | Hoeger | F01D 5/142 415/181 |
| 2012/0243983 A1 | | 9/2012 | Breeze-Stringfellow | |

FOREIGN PATENT DOCUMENTS

| | | |
|---|---|---|
| FR | 2939852 A1 | 6/2010 |
| GB | 1299686 A | 12/1972 |
| JP | 2001027103 A | 1/2001 |

\* cited by examiner

# AXIAL TURBOMACHINE STATOR WITH AILERONS AT THE BLADE ROOTS This application claims priority under 35 U.S.C. §119 to European Patent Application No. 13166527.5, filed 3 May 2013, which is incorporated herein by reference for all purposes.

BACKGROUND

1. Field of the Application

The present application relates to the stator of an axial compressor. More particularly, the present application relates to a stator of an axial turbomachine comprising main blades and auxiliary blades associated with the main blades. The present application also relates to an axial turbomachine fitted with a stator in accordance with the present application.

2. Description of Related Art

In order to straighten their annular flows, axial turbomachines have stators. These arrays of blades are located downstream of each annular row of rotor blades. They deflect an annular flow so as to convert the tangential component into an axial component. This flow is then able to be re-accelerated by a further annular array of rotor blades located downstream.

A stator generally has an inner shell and an outer shell between which the stator blades extend radially. In operation, the annular flow may break away from the blades, thus creating entropy that reduces the turbomachine's efficiency.

Patent FR2939852A1 discloses a bladed stator fitted with intermediate blades. These can be carried by an inner shell or an outer shell. Their dimensions are smaller than those of the stator blades and they are located in the downstream part of the stator, recessed relative to the main blades. This stator architecture is intended to reduce stalling at the shell. However, stalling can still occur on the suction side of the blades. They cause vortices which further reduce the turbomachine's efficiency.

Patent EP1927723B1 discloses a stator stage of a turbomachine axial compressor. A series of slats are located on the suction side of each blade. The slats reduce secondary flows between the blades. However, they are located axially at the blades. Stalling may however be observed on the suction surface of the blade, close to its trailing edge. This stalling generates entropy that reduces the turbomachine's efficiency. The presence of a plurality of slats reduces the flow area in the annular stream, which creates pressure drops.

Although great strides have been made in the area of stators for axial compressors, many shortcomings remain.

DETAILED DESCRIPTION OF THE PREFERRED EMBODIMENT

Figure 1:
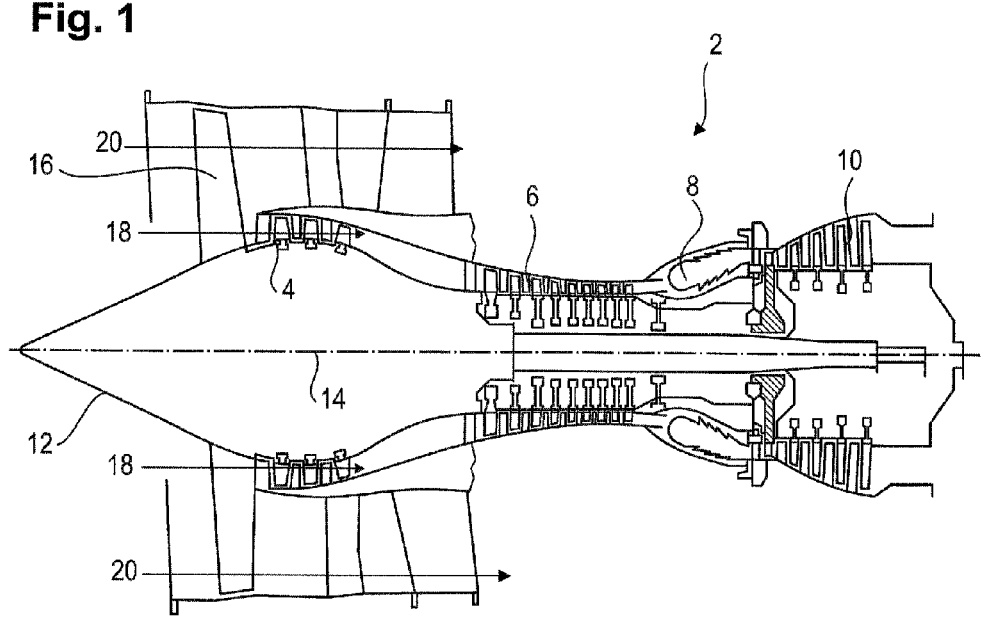
FIG. 1 shows an axial turbomachine in accordance with the present application.

The present application aims to solve at least one of the problems presented by the prior art. More specifically, the present application aims to improve the capacity of a stator to straighten a flow. More specifically, the present application aims to increase the output pressure of a bladed stator. The present application also aims to improve the performance of a compressor with a bladed stator.

The present application relates to an axial stator of a turbomachine, comprising: a main annular row of stator blades extending radially, each of the said blades comprising a pressure side and a suction side; a series of auxiliary stator blades arranged between the main blades; wherein each of the auxiliary blades is associated with one of the main blades extending along and downstream of the pressure face of the associated primary blade, at a distance, in a circumferential direction, which is less than 30% of the distance between two neighbouring main blades.

According to an advantageous embodiment of the present application, the auxiliary blades extend substantially parallel to its associated main blade, respectively.

According to an advantageous embodiment of the present application, each auxiliary blade axially overlaps its associated main blade over a distance C between 5% and 50%, preferably between 10% and 30%, of its axial length.

According to an advantageous embodiment of the present application, the axial overlap between each auxiliary blade and its associated main blade is limited to the distance C.

According to an advantageous embodiment of the present application, that parts of the auxiliary blades that extend from their leading edge to 30% of their chord in an axial direction is level with the trailing edges of their associated respective main blade.

According to an advantageous embodiment of the present application, the chord length of each auxiliary blade is smaller, preferably 50%, more preferably 40%, more preferably 30% than that of its associated main blade.

According to an advantageous embodiment of the present application, the chord of each auxiliary blade forms an angle α with the chord of its associated respective main blade, which is between 5° and 45°, preferably between 5° and 20°.

According to an advantageous embodiment of the present application each auxiliary blade is positioned and aligned to generate, during the turbomachine's operation, negative pressure at the trailing edge of the associated main blade, the said negative pressure deflecting by suction a part of the circulating flow from the suction face of the associated main blade towards the said trailing edge.

According to an advantageous embodiment of the present application, each of the auxiliary blades has a pressure face and a suction face, the latter facing the pressure face of the associated main blade, the suction face of the auxiliary blade generating negative pressure at the trailing edge of its associated main blade.

According to an advantageous embodiment of the present application, the chord of each auxiliary blade forms an angle with the tangent to the pressure face of its main blade at the associated trailing edge which is less than 20°, preferably 15°, more preferably 10°.

According to an advantageous embodiment of the present application, the auxiliary blades axially overlap the associated main blades over a distance C between 5% and 50%, preferably between 10% and 30%, of their axial length.

According to an advantageous embodiment of the present application, an auxiliary blade has a radial height ranging between 10% and 100%, preferably between 10% and 50%, more preferably between 15% and 25% of the radial height of its associated main blade.

According to an advantageous embodiment of the present application, each main blade comprises a first part and a second part located radially relative to each other, the second part of the pressure face is axially more curved than the first part, each auxiliary blade extending radially along substantially 80% to 120%, preferably 90% to 110%, of the radial height of the second part of its associated main blade.

According to an advantageous embodiment of the present application, each auxiliary blade has a radial height ranging between 80% and 120%, preferably between 90% and 110%, of the radial height of the second part of its associated main blade.

According to an advantageous embodiment of the present application, the stator comprises an outer annular wall and preferably an inner annular wall coaxial with the outer annular wall, the primary blades extending radially from the outer annular wall, the auxiliary blades extending radially from the outer annular wall and/or the inner annular wall.

According to an advantageous embodiment of the present application, the auxiliary blades and the annular wall, or one of annular walls, from which the said blades extend are formed integrally, preferably made of a composite material or a metallic material.

According to an advantageous embodiment of the present application, a single auxiliary blade is associated with each of the main blades.

According to an advantageous embodiment of the present application, a single auxiliary blade is present between two adjacent main blades.

The present application also relates to a turbomachine comprising a compressor and/or a turbine with at least one stator, wherein the or at least one stator is in accordance with the present application.

According to an advantageous embodiment of the present application, the area of each main blade is greater than the area of the auxiliary blade.

According to an advantageous embodiment of the present application, the annular main blade row comprises at least one main blade different and/or differently arranged with respect to the other main blades in the row.

The present application can reduce and/or delay the onset of a stall in a flow bypassing a main blade on its suction face side. Stalling can be eliminated. The present application thus enables the force exerted by the blades in a stator to be increased and the ability of the latter to straighten a flow is improved.

Each auxiliary blade indirectly contributes to straightening the flow. It provides support to the main blade by sucking part of the flow that bypasses the latter's suction face. It also contributes directly because of its geometry and its own surface which extends into the flow.

The number of blades in such a stator can be reduced. The passageways between its blades can be widened, which also improves performance. In addition to being lighter, this stator will be less costly to produce.

The present application improves the performance of a compressor or a turbine fitted with such stators. A turbomachine fitted with such a compressor and/or such a turbine will be more efficient.

In the following description, the terms inner or internal and outer or external refer to a position relative to the axis of rotation of an axial turbomachine.

FIG. 1 shows schematically an axial turbomachine. In this case it is a double-flow turbojet. The turbojet 2 comprises a first compression stage, a so-called low-pressure compressor 4, a second compression stage, a so-called high pressure compressor 6, a combustion chamber 8 and one or more turbine stages 10. In operation, the mechanical power of the turbine 10 is transmitted through the central shaft to the rotor 12 and drives the two compressors 4 and 6. Reduction mechanisms may increase the speed of rotation transmitted to the compressors. Further, different turbine stages can be connected to the compressor stages through concentric shafts. These latter comprise several rotor blade rows associated with stator blade rows. The rotation of the rotor thus generates a flow of air and progressively compresses it up to the inlet of the combustion chamber 10.

An inlet fan, commonly designated a fan 16, is coupled to the rotor 12 and generates an airflow which is divided into a primary flow 18 passing through the various abovementioned levels of the turbomachine, and a secondary flow 20 passing through an annular conduit (shown in part) along the length of the machine and then rejoins the main flow at the turbine outlet. The primary flow 18 and secondary flow 20 are annular flows and are channelled through the housing of the turbomachine. To this end, the housing has internal or external cylindrical walls or shells.

Figure 2:
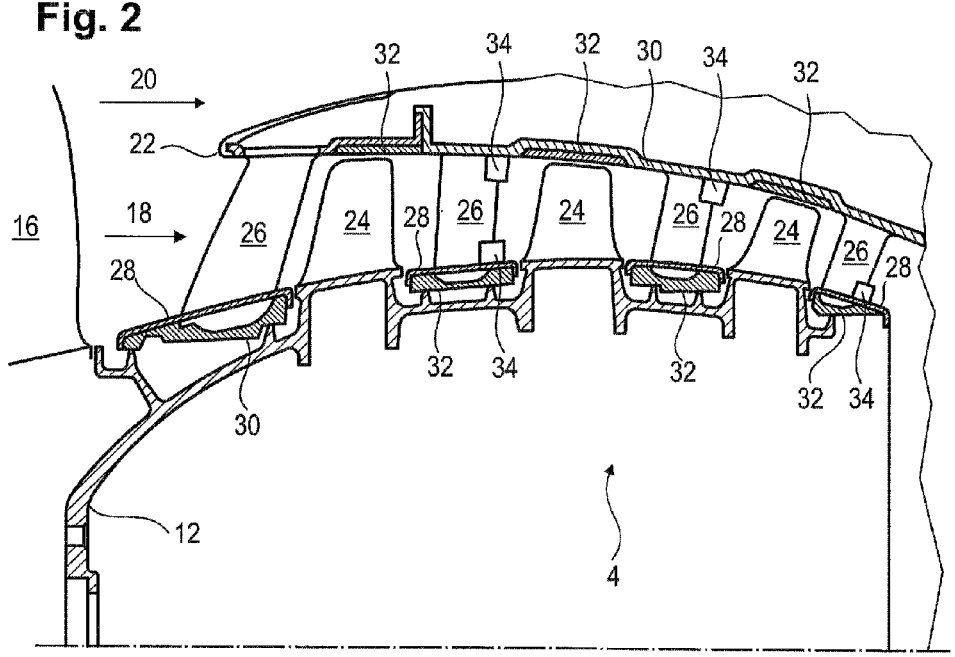
FIG. 2 is a sectional view of a turbomachine compressor in accordance with the present application.

FIG. 2 is a sectional view of a low-pressure compressor 4 of an axial turbomachine 2 such as that of FIG. 1. Part of the turbofan 18 can be seen, as can the splitter nose 22 between the primary 18 and secondary 20 airflows. The rotor 12 comprises several rows of rotor blades 24, in this case three.

The low-pressure compressor 4 includes several stators, in this case four, each containing a row of stator blades 26. Stators are associated with a fan 16 or a row of rotor blades for straightening the airflow so as to convert the velocity of the stream into pressure. The combination of a stator and rotor blade row together forms a compression stage.

A stator comprises at least one annular wall, preferably two annular walls which are designed to guide the annular primary flow 18. The annular walls may be an inner shell 28 or an outer housing 30. At least one stator may comprise one, preferably several layers of abradable material 32. Advantageously, the compressor comprises layers of abradable material 32 beneath each inner shell 28 and on the housing 30 at the outer ends of each rotor blade row 24.

The stator blades 26 extend substantially radially from the outer housing to their associated inner shell 28. This is fixed to the inner end of the stator blades 26. These latter are regularly spaced from each other, and have the same angular orientation to the flow. Advantageously, these blades are identical. Optionally, the spacing between the blades can vary locally as can their angular orientation. Some blades can be different from the rest of the blades in the row.

The stator comprises main stator blades 26. At least one of the stators is fitted with at least one auxiliary stator blade 34, which is located downstream of one of its main blades 26. Preferably, each main blade 26 of the same stator is fitted with an auxiliary blade 34. The assembly of auxiliary stator blades 34 form an annular blade row. Also preferably, all stators are fitted with auxiliary blades 34.

The auxiliary blades 34 extend radially from an annular wall (28, 30). A single main blade 26 can be equipped with two auxiliary blades 34. One extends radially from an inner shell 28 and the other from the outer housing 30. The tips of these two auxiliary blades 34 are spaced from each other. Optionally, all the blades on the same stator are fitted with two auxiliary blades 34.

An inner shell 28 and its auxiliary blades 34 may be formed integrally. Part of the outer casing 30 and its auxiliary blades 34 may be formed integrally. For this purpose, the outer housing 30 may be formed of several outer shells each being part of a stator. A stator can be segmented. A stator or a stator segment can be formed integrally. A stator or a stator segment may be made of composite materials and be injected, or be made of metallic materials and be machined by electrical discharge machining.

Figure 3:
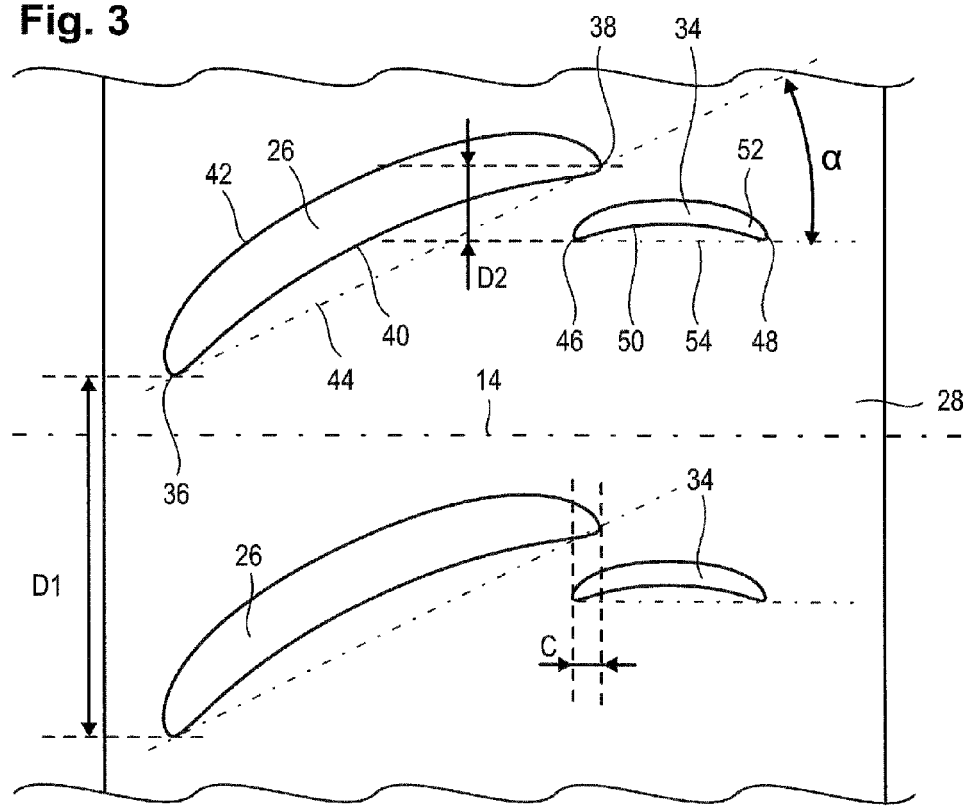
FIG. 3 is a plan view of one of the stators of the compressor shown in FIG. 1, in accordance with the present application.

FIG. 3 is a plan view of a part of a stator of the compressor of FIG. 2.

The stator comprises main blades 26 and auxiliary blades 34, each one of which is associated with a main blade 26. The main blades 26 each have a leading edge 36 and a trailing edge 38. They each have a pressure face 40 and a suction face 42. These faces extend from the blade's leading edge 36 to its trailing edge 38. The main blades can be curved locally or over their entire height. The chords 44 of the main blades 26 are typically inclined relative to turbomachine's axis of rotation 14.

The auxiliary blades 34 are located axially relative to the trailing edges 38 of the main blades 26, between the said blades. Each of the auxiliary blades 34 is associated with a main blade 26 and located in the vicinity of the trailing edge 38 of the said blade. The auxiliary blades 34 each have a leading edge 46 and a trailing edge 48. They each have a pressure face 50 and a suction face 52. These faces extend from the blade's leading edge 46 to its trailing edge 48. The suction face 52 of an auxiliary blade 34 faces the pressure face 40 of its associated main blade 26.

The spacing between the main blades 26 is greater than twice the distance between a main blade 26 and its associated auxiliary blade 34. The distance D1 between the leading edges 36 of the main blades 26 is greater than twice the tangential distance D2 between the trailing edge 38 of a main blade 26 and the leading edge 46 of its associated auxiliary blade 34, preferentially greater than four times, more preferably greater than ten times.

The main blades 26 and the auxiliary blades 34 overlap axially. This axial overlap C is between 1% and 90% of the length of the auxiliary blades 34, preferably between 10% and 60%, more preferably between 20% and 40%.

The chords 54 of the auxiliary blades 34 are inclined with respect to the chords 44 of the main blades 26. The angle α is between 1° and 30°, preferably between 5° and 20°, more preferably between 8° and 12°. The inclination of the chords 44 of the main blades 26 relative to the stator axis 14 is greater than the inclination of the chords 54 of the auxiliary blades relative to the stator axis 14, preferably generally twice.

Figure 4:
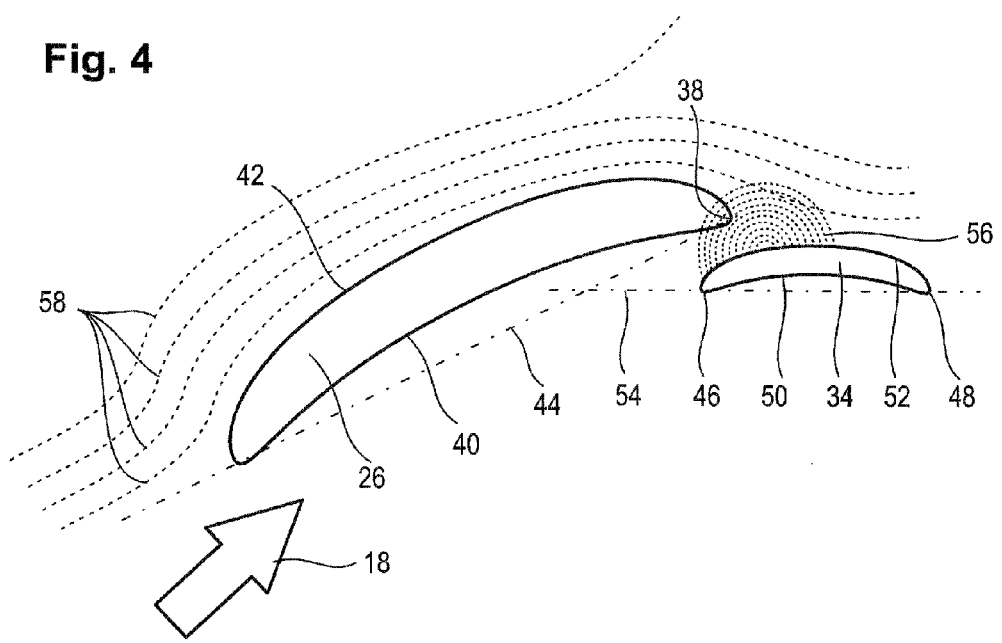
FIG. 4 shows a stator main blade and an auxiliary blade in accordance with the present application.

FIG. 4 shows a main blade 26 and its associated auxiliary blade 34.

The auxiliary blade 34 is designed to create a low-pressure area 56 in the flow straightened by the stator. This low-pressure area 56 extends axially and radially. It essentially extends radially from the auxiliary blade 34. It also extends tangentially to the pressure face of the main blade 26 and preferably beyond the suction face of the main blade 26. It extends axially downstream of the trailing edge 38 of the main blade 26.

With this configuration, the primary flow 18 from the rotor blades is closer to the suction face 42 of the main blade 26. The flow paths are thus shown with lines of flow 58. Some of these lines are close to the suction face 42 of the main blade. Those which are closest to this face are sucked in by the low-pressure area 56 close to the trailing edge 38 of the main blade 26.

Note that the flow line farthest from the main blade 26 breaks away from the suction face. This flow line is not straightened over the full length of the main blade 26. It should be noted that in the absence of the auxiliary blade 34, all flow lines break away before reaching the trailing edge of the main blade 26, thereby reducing the stator's efficiency. The present application therefore improves the stator's ability to straighten the flow. It delays and/or reduces stalling. Possibly, it eliminates it. And the force exerted by each main blade is increased. The efficiency of each main stator blade is increased, so that it becomes possible to reduce their number. In addition to this being a cost saving, this also improves the stator's efficiency.

To generate a low-pressure area 56, the auxiliary blade 34 may have different characteristics. It may have a chord 54 which is inclined relative to the chord of the main blade 26, its inclination with respect to the stator's axis being less than that of the main blade 26. To create a low-pressure area while at the same time straightening the flow, the auxiliary blade 34 and/or its chord 54 may be generally parallel to the trailing edge 38 of the main blade 26.

In addition or alternatively, the auxiliary blade 34 may have a camber. Its profile can also vary in thickness. Thus, its pressure face 50 and its suction face 52 have significantly different lengths. Low pressure is particularly important on the suction face 52.

The low-pressure area 56 is generally generated by the upstream part of the auxiliary blade 34. This stems from the fact that at this point the flow undergoes the greatest acceleration. The low-pressure area 56 usually extends over the upstream third of the auxiliary blade 34. It is therefore advisable to arrange the two blades relative to each other such that the trailing edge 38 of the main blade 26 is located axially in the upstream third of the auxiliary blade 34.

The low-pressure area 56 may be generally axially symmetrical. Therefore, the trailing edge 38 of the main blade 26 may be located axially by being pushed back in relation to the leading edge 46 of the auxiliary blade 34 by one-sixth of its chord. Thus, the trailing edge 38 of the main blade 26 will be located at the point of minimum pressure for a given distance D2.

Figure 5:
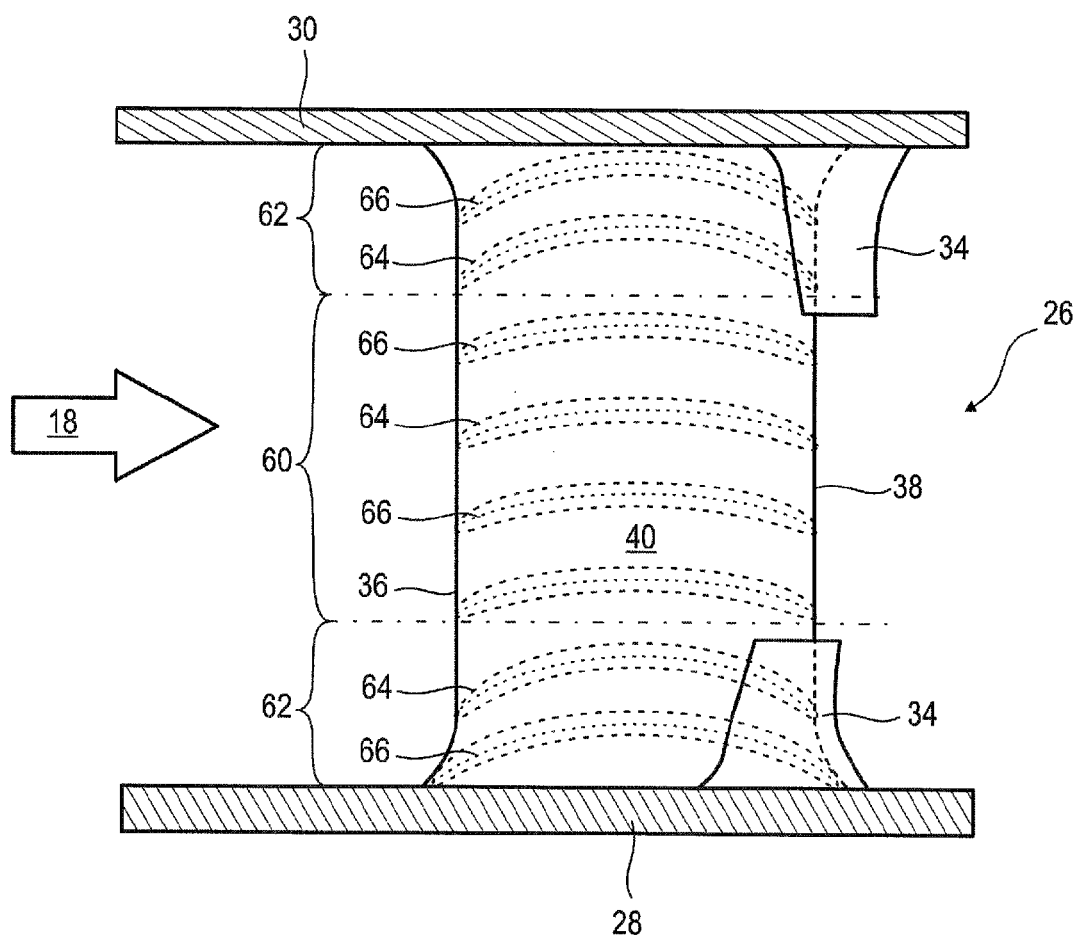
FIG. 5 shows a stator in accordance with the present application in which the blades are viewed tangentially relative to the annular shape of the stator.

FIG. 5 shows a stator in accordance with the present application in which the blades are viewed tangentially relative to the annular shape of the stator.

The stator has main blades 26 which extend radially between the inner shell 28 and the housing 30. At least one main blade 26 of the stator, preferably all the main blades of the stator have a first part 60 and at least a second part 62 located radially with respect to the other. The first part 60 may be an inner part, and the second part 62 may be an outer part. Radially on the or at least one of the second parts 62, the pressure face 40 is axially more curved than on the first part 60. This feature keeps the annular flow 18 away from the wall or walls of the annular stream.

This axially curved nature can be seen in the tangential direction while moving axially along the pressure face 40 of the main blade. Optionally, the first part 60 has profiles 64 where the neutral axes 66 are essentially straight lines. The neutral axes 66 of the profiles 64 of the or one of the second parts 62 have mean radii of curvature less than those of the neutral axes 66 of the profiles 64 of the first part 60.

The first part 60 may be a central part 60, and the second part 62 may be a lateral part 62. According to an advantageous embodiment of the present application, each main blade 26 comprises a second lateral part 62, the central part 60 being between the lateral parts. At both lateral parts 62, the pressure face 40 is axially more curved than at the first part 60. The lateral parts 62 are connected to the stator's annular walls.

The lateral parts 62 are those where stalling of the flow on the suction face 40 is more likely to occur. It is therefore advisable to locate the auxiliary blades 34 at the trailing edges 38. Advantageously, an auxiliary blade 34 is associated with each second part 62 of each main stator blade 26. The auxiliary blades 34 extend radially mainly along each second part 62. Each one may extend along 70% to 130%, preferably 80% to 120%, more preferably from 90% to 110% of the radial height of the second part 62 of its associated main blade 26. This feature is designed to optimise the flow area in the primary flow 18, which is occupied by the auxiliary blades 34, with respect to the effect they produce.

The invention claimed is:

1. Axial stator of an axial turbo compressor (2), comprising:
   an annular row of main stator blades extending radially, each of the blades having a pressure surface and a suction surface; and
   a series of auxiliary stator blades located between the main blades;
   wherein each of the auxiliary blades is associated with one of the main blades by extending along and downstream of the pressure face of the associated main blade, at a distance from said blade, in a circumferential direction, which is less than 30% of the distance between two adjacent main blades;
   wherein the radial height of the auxiliary blades relative to the radial height of the main blades ranges between 10% and 50%.

2. The stator according to claim 1, wherein the auxiliary blades extend substantially parallel to their associated main blades, respectively.

3. The stator according to claim 1, wherein the auxiliary blades axially overlap the associated main blades over a distance C between 5% and 50% of their axial length.

4. The stator according to claim 1, wherein the auxiliary blades axially overlap the associated main blades over a distance C between 10% and 30% of their axial length.

5. The stator according to claim 1, wherein the chord length of each auxiliary blade is 50% smaller than that of its associated main blade.

6. The stator according to claim 1, wherein the chord length of each auxiliary blade is 40% smaller than that of its associated main blade.

7. The stator according to claim 1, wherein the chord length of each auxiliary blade is 30% smaller than that of its associated main blade.

8. The stator according to claim 1, wherein the chord of each auxiliary blade forms an angle a with the chord of its associated respective main blade, which is between 5° and 45°.

9. The stator according to claim 1, wherein the chord of each auxiliary blade forms an angle a with the chord of its associated respective main blade, which is between 5° and 20°.

10. The stator according to claim 1, wherein each auxiliary blade is positioned and configured to generate, during the turbomachine's operation, a low-pressure area at the trailing edge of the associated main blade, the negative pressure deflecting by suction a part of the circulating flow from the suction face of the associated main blade towards the trailing edge.

11. The stator according to claim 1, wherein each auxiliary blade has a pressure face and a suction face, the suction face being opposite the pressure face of the associated main blade, the suction face of the auxiliary blade generating a low-pressure area at the trailing edge of the associated main blade.

12. The stator according to claim 1, wherein the radial height of the auxiliary blades relative to the radial height of the main blades ranges between 15% and 25%.

13. The stator according to claim 1, wherein each main blade comprises:
   a first and a second part radially divided, the cross section of the pressure face of the second part being more curved than the first part, each auxiliary blade extending radially essentially to 80% to 120% of the radial height of the second part of the associated main blade.

14. The stator according to claim 1, wherein each main blade comprises:
   a first and a second part radially divided, the cross section of the pressure face of the second part being more curved than the first part, each auxiliary blade extending radially essentially to 90% to 110% of the radial height of the second part of the associated main blade.

15. The stator according to claim 1, further comprising:
   an outer annular wall and an inner annular wall coaxial with the outer annular wall, the main blades extending radially from the outer annular wall, the auxiliary blades extending radially from the outer annular wall and/or from the inner annular wall.

16. The stator according to claim 15, wherein the auxiliary blades and the outer annular wall or the inner annular wall from which the blades extend are formed integrally of a composite material or a metallic material.

17. The stator according to claim 1, wherein a single auxiliary blade is associated with each of the main blades.

18. A turbomachine comprising:
   a compressor; and
   a turbine having at least one stator comprising:
   an annular row of main stator blades extending radially, each of the blades having a pressure surface and a suction surface; and
   a series of auxiliary stator blades located between the main blades;
   wherein each of the auxiliary blades is associated with one of the main blades by extending along and downstream of the pressure face of the associated main blade, at a distance from said blade, in a circumferential direction, which is less than 30% of the distance between two adjacent main blades;
   wherein the radial height of the auxiliary blades relative to the radial height of the main blades ranges between 10% and 50%.

* * * * *